United States Patent [19]
Quayle

[11] 3,978,394
[45] Aug. 31, 1976

[54] LOAD AND LINE BALANCING CIRCUIT
[75] Inventor: Bruce R. Quayle, Utica, Mich.
[73] Assignee: Oxy Metal Industries Corporation, Warren, Mich.
[22] Filed: Nov. 25, 1974
[21] Appl. No.: 526,926

[52] U.S. Cl. ................................. 323/19; 321/11; 321/18; 323/22 SC; 323/34
[51] Int. Cl.² ....................................... H02M 7/155
[58] Field of Search............ 307/252 N, 252 Q, 297; 321/11–14, 16, 18; 323/9, 16, 19, 22 SC, 34

[56] References Cited
UNITED STATES PATENTS

| | | | |
|---|---|---|---|
| 3,193,753 | 7/1965 | Fleming | 321/18 |
| 3,409,821 | 11/1968 | Bingley | 323/34 X |
| 3,465,234 | 9/1969 | Phadke | 321/18 X |
| 3,519,917 | 7/1970 | Martin | 323/22 SC |
| 3,670,234 | 6/1972 | Joyce | 321/18 |
| 3,735,241 | 5/1973 | O'Sullivan | 323/22 SC |

Primary Examiner—A. D. Pellinen
Attorney, Agent, or Firm—Harness, Dickey & Pierce

[57] ABSTRACT

A circuit for use in connection with an electrochemical painting apparatus wherein the painting load circuit is connected to a source of three-phase electrical supply by means of a plurality of controlled rectifiers connected as a full wave rectifier. The firing circuit for the control rectifiers includes a normal firing circuit which is phase controlled, the input to the normal firing circuit being supplied from a flip-flop circuit, the flip-flop circuit being adapted to store a start signal and regenerate the start signal for each phase of the multiphase supply in response to the sensing of the zero voltage crossover point for each phase. A similar situation occurs on the stop signal wherein the stop signal occurs and the flip-flop stores that condition until such time as the voltage waveform again crosses zero to signal the end of a cycle.

19 Claims, 5 Drawing Figures

LOAD AND LINE BALANCING CIRCUIT

BACKGROUND AND SUMMARY OF THE DISCLOSURE

This invention relates generally to a trigger system for a controlled rectifier and more specifically to a trigger system for a controlled rectifier which is adapted to regenerate a start and stop signal for each phase in response to a start and stop signal for all phases.

The system of the present invention will be described specifically in conjunction with a system for electochemical painting. However, it is to be understood that the system of the present invention could be used in any environment wherein a load is supplied from a single or multiphase source of electrical energy and the start and stop signal for supplying that energy to the load is generated asynchronously with the line voltage. For example, the system could be utilized in electro refining copper wherein the potential on the workpiece must be reversed periodically to prevent fouling. In this situation, interrupting the triggering pulses on one set of control rectifiers and starting triggering on another set to give reversed output potential across the load is utilized to prevent the fouling. A short time later, the procedure is again reversed. This alternate interruption and starting must be balanced to insure balancing of the load through the supply transformer.

In electochemical painting systems, the painting load is supplied, typically, from a source of three-phase potential through a supplying transformer. The secondary of the transformer is connected to the load through a plurality of six controlled rectifiers, three sets of two of the rectifiers being connected in back-to-back relation in the secondary circuit of each phase of the three-phase supply. The start and stop signal for the overall system is either generated automatically or manually wherein a single start and stop signal is generated for the entire system. For example, an automatic system would include a control circuit which would generate an off time control signal and an on time control signal to time the off time and on time for the electrochemical painting process. The off time and on time control circuit could be a resistor-capacitor timing circuit, a pulse counting circuit, or oven a manual timing circuit.

In most of these systems, the off time and on time control circuits are not synchronized with the line, or the control may be synchronized with one phase of the source of supply. In either event, the on time and off time control signals are not generated in synchronism with each phase of the multiphase supply. For example, in the case of the off time and on time control signal being generated in synchronism with one phase, it is seen that the signal may be generated out of synchronism with the other two phases of the supply source. This would create an unbalance for the supply transformer on a phase-to-phase basis wherein one phase may be energized for a greater or lesser period than other phases in the supply. Further, it is possible that an asynchronous start and stop signal may generate a firing signal on one half wave of a particular phase which is greater than or less than the firing signal generated on an opposite half wave. The unbalance creates an unbalance in the supply transformer thereby causing the transformer to become saturated.

This situation is cured by the system of the present invention wherein the start and stop signal which is generated for all phases is stored for each of the three phases and the start and stop signal is modified by being generated in response to the zero voltage crossover point for both the stop and start signal for each of the three phases in the particular example being utilized. Thus, a gating signal for the controlled rectifiers of the three-phase system is modified by the controlled regeneration of that gating signal, the regenerated signals being generated in response to the generation of the start and stop signal and the sensing of the zero crossover point. Thus, the modified gating signals would be three in number and would be out of phase, one with the other, by 120 degrees as exists in the phasing of the three phases.

Accordingly, it is one object of the present invention to provide an improved firing signal for control devices supplying an alternating current source of supply to a load.

It is another object of the present invention to provide an improved firing signal for an alternating source of supply which provides balancing of a supply transformer connected to the alternating source of supply.

It is a further object of the present invention to provide an improved firing signal for a controlled rectifier device controlling the supply of energy from an alternating source to a load wherein the firing of the controlled devices is synchronized with the line voltage.

It is a further object of the present invention to provide an improved firing signal for a controlled device supplying energy from a multiphase source to a load wherein the firing signal is synchronized with the line voltage for each phase of the source.

It is a further object of the present invention to provide an improved firing signal for a control device supplying energy from a supply transformer to a load wherein the firing signal insures nonsaturation of the transformer due to unbalanced firing of the control device.

It is another object of the present invention to provide an improved firing signal for a control device supplying energy from a multiphase source to a load wherein the firing signal is synchronized to provide phase-to-phase balance through the transformer.

It is a further object of the present invention to provide an improved firing system for controlled rectifiers which is simple to assemble, inexpensive to construct and reliable in operation.

The invention to be protected will be particularly pointed out and distinctly claimed in the claims appended hereto. Further objects, features and advantages of the present invention will become more readily apparent from a detailed study of the specification, when taken in conjunction with the attached drawings, in which:

Figure 1:
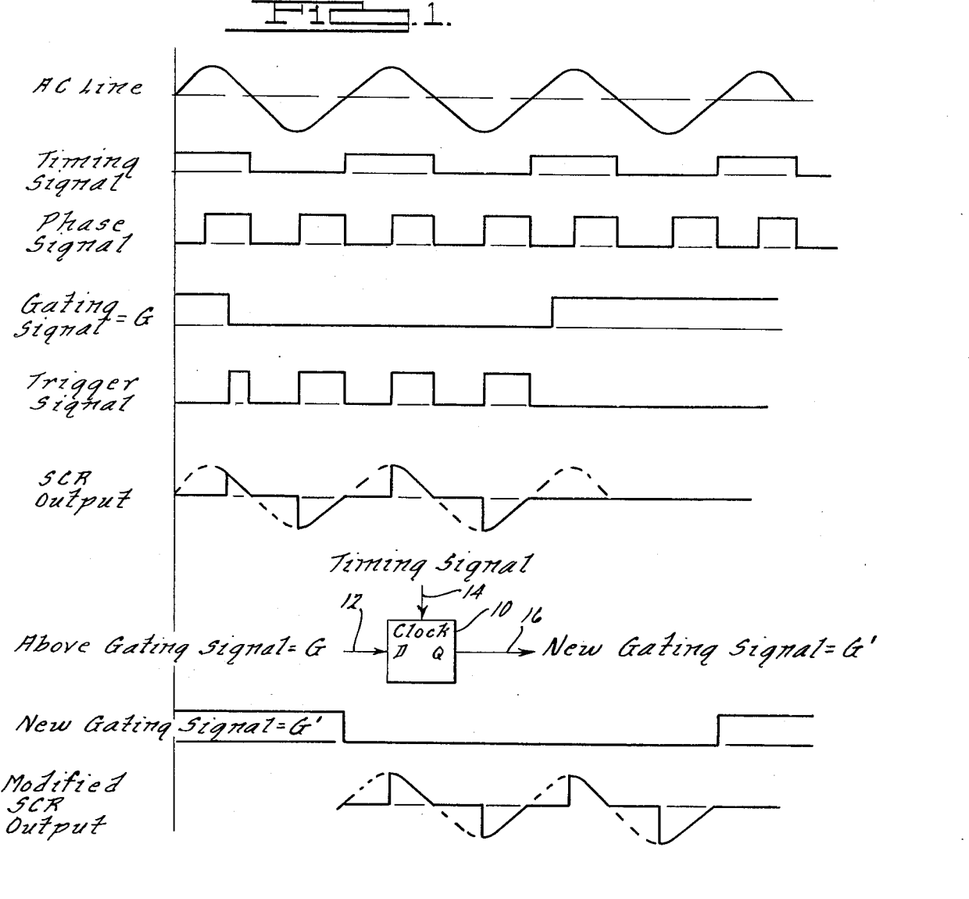
FIG. 1 is a timing diagram illustrating the operation of the supply of current of a single phase to a load in the situation where the invention has not been incorporated into the system and the situation in which the invention has been incorporated in the system.

Referring now to the drawings, and particularly to FIG. 1 thereof, there is illustrated a timing diagram which demonstrates the unbalance problems involved with controlling the firing of controlled rectifiers without the system of the present invention and certain other portions of FIG. 1 demonstrate the balance that occurs when the system of the present invention is incorporated into a controlled rectifier firing system. Specifically, the first timing diagram illustrates the alternating current line voltage supply for one phase of a multiphase system supplying electrical energy to the load through a controlled rectifier. In the illustrated example, a gating signal G is generated by any desired means, for example, an on-off switch or an automatic gating signal generator which senses some condition of the load or some other condition. It is to be noted that in the illustrated example, the gating signal G drops from a logical one to a logical zero level some time after the ninety degree phase point in the alternating current line, this point being arbitrarily selected. The generation of the gating signal G permits the generation of a trigger signal within the firing network controlling the gate electrode of the control rectifier.

In the particular example illustrated, a ninety degree firing angle has been selected to provide 50% of the available electrical energy to the load. As is seen from the diagram illustrating the control rectifier output, the first firing pulse, designated the trigger signal, occurs as soon as the gating signal has been generated. It is seen that the control rectifier output occurs after the ninety degree point due to the fact that the gating signal G was generated after the ninety degree point. Thus, the control rectifier conducts for approximately 45° of the positive half wave. The second trigger signal is a complete trigger signal in that the gating signal has already occurred in the previous half cycle and the firing of the control rectifier is then permitted at the desired two hundred seventy degree point. Thus, the control rectifier for the negative half wave fires from the 270° point to the 360° point. Subsequent firings of the control rectifier occur at the desired 90° and 270° point to permit flow of current during half of each alternating half wave. The gating signal G is then terminated by rising from a logical zero to a logical one level. This turns off the gating signal for the controlled rectifier and the controlled rectifier will continue to conduct for the remainder of the half wave. This introduces another source of unbalance in the supply transformer.

As will be seen from a study of the SCR output wave form, the average current during the positive half wave is less than the average current for the negative half wave, due to the fact that the firing signal for the first half wave occurred later than the 90° point, specifically at approximately 135°. Thus, more current flows during the negative half cycle than flows during the positive half cycle. This will cause unbalance in the transformer which, if it persists, will cause saturation of the transformer.

A similar situation would occur in the other two phases of a three-phase source of supply in that the gating signal G is arbitrarily selected both in starting point and duration to accommodate a particular load condition. Thus, additional unbalances would occur on a phase-to-phase basis and also within particular phases of the source of supply.

Looking now at the timing diagram of FIG. 1 with the concept of the present invention applied, it is seen that the gating signal G is generated as described above. However, this gating signal is presented to the "D" input of a D flip-flop 10 by means of a conductor 12, the gating signal G remaining at the D input of the flip-flop 10 until a positive transition of the signal level at the clock input permits transmission of the D input signal level to the Q output. Also, the D input signal level is then stored in the flip-flop 10. The system of the present invention includes a zero voltage crossover sensing arrangement to be described in conjunction with the description of FIGS. 2 and 3, this signal being designated in the timing diagram as a timing signal.

As is seen from the timing signal timing diagram, the timing signal goes positive at the start of each positive half wave. Accordingly, the timing signal rises from a logical zero to a logical one level at the zero crossover point for the positive half wave of the alternating current line voltage. Upon sensing the zero voltage crossover point in the positive-to-negative direction, the timing signal drops from a logical one to a logical zero and remains at that level until the subsequent positive zero voltage crossover point is sensed for the subsequent positive half wave.

Accordingly, with the gating signal G being fed to the D flip-flop 10 by means of conductor 12, the timing signal is fed to the clock input of the D flip-flop by means of a conductor 14. It is this timing signal that produces the new gating signal G' on an output conductor 16 and stores the signal at the D input. This new gating signal G' is utilized to control the firing of the control rectifier in response to the trigger signals. Thus, a trigger signal for any half wave within the on time period of the new gating signal G' will always occur at the proper phase angle and no controlled rectifier will be fired for a shorter period of time than the desired phase angle.

The turn-off signal occurs when the gating signal G rises from a logical zero to a logical one level. This signal is presented to the D input of the D flip-flop 10 to await a further timing signal from the zero crossover point sensing circuit. Accordingly, the D flip-flop 10 will store the new signal level at the D input upon sensing the positive going edge of the timing signal which occurs after the termination of the gating signal G. In this way the new gating signal G' will rise from a logical zero to a logical one level upon the occurrence of the positive going edge of the timing signal.

In looking at the new gating signal G', it is seen that the gating signal occurs at the zero voltage crossover point for the complete positive half wave occurring after the generation of the gating signal G and terminates at the positive going zero voltage crossover point which occurs after the termination of the gating signal G. Thus, the on time for the controlled rectifiers is determined by the zero voltage crossover point for the alternating current line and trigger signals occurring within that time will occur at the proper phase angle.

The timing signal illustrated below the alternating current line also occurs for each phase of the multiphase power supply. Accordingly, a new gating signal G' will be generated for each phase of the multiphase supply, the start of the new gating signal G' being generated at the zero voltage crossover point for each phase of the multiphase supply. Thus, the starting point for each new gating signal G' for each phase will be synchronized with that particular phase. This also occurs for the termination of the gating signal G' for each phase wherein the gating signal G' is terminated for each phase in synchronism with that particular phase. In the case of a three-phase source of supply, three individual new gating signals G' will be generated in response to a single gating signal G, the new gating signal G' for each phase being one hundred twenty degrees out of phase from the previous phase.

Attention is directed to the modified SCR output signal at the bottom of FIG. 1 wherein it is seen that the new gating signal G' for the phase illustrated occurs at the zero voltage crossover point and is on for an integral number of complete cycles of the alternating current supply. When the trigger signal occurs as seen in the middle of FIG. 1, the control rectifier is fired, for example at the ninety degree point, and the control rectifier conducts for the remaining portion of that half cycle. The subsequent portion of the negative half cycle is conducted through the control rectifier at the 270° point and conducts for the remaining portion of the cycle. Accordingly, it is seen that the average positive current flowing through the input transformer is equal to the average negative current flowing through that same transformer to preclude any unbalance within the transformer. Also, the other phases in the multiphase supply will be fired exactly as is illustrated in FIG. 1 to insure that each phase conducts for the same number of positive and negative half cycles as is illustrated due to the fact that the new gating signal G' for each individual phase is as long as the gating signal G' illustrated and is 120° out of phase from the previous phase.

Figures 2, 4:
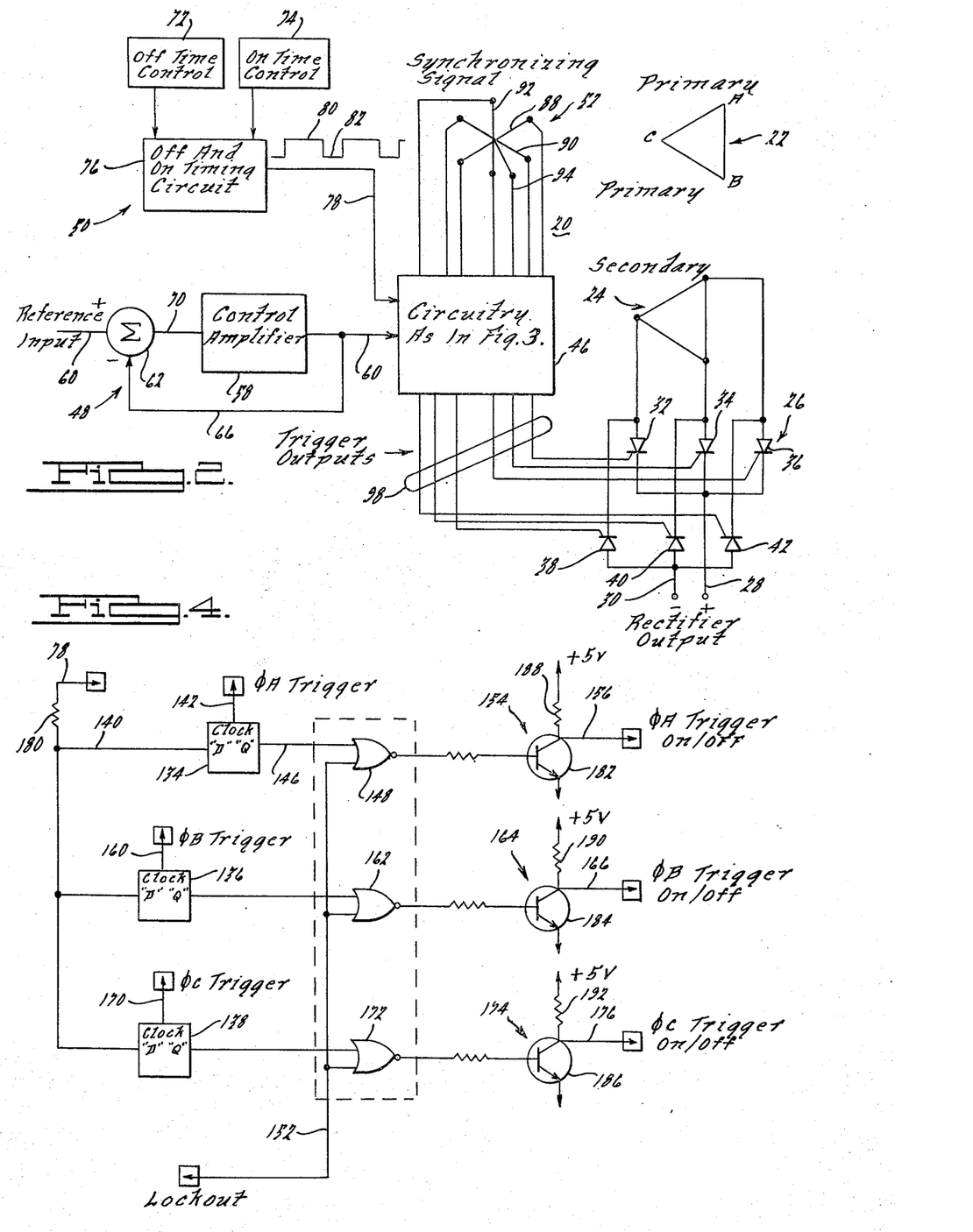
FIG. 2 is a block diagram illustrating the details of the overall system incorporating the features of the present invention.
FIG. 4 is a schematic diagram illustrating certain details of the circuit illustrated in FIG. 3.

Referring now to FIG. 2, there is illustrated a block diagram 20 of the entire system utilized in controlling the flow of electrical energy to a rectifier output, the rectifier output in this case being connected to an electrochemical painting assembly. Specifically, a three-phase source of supply is connected to the primary winding 22 of a transformer which includes phases AC, CB, BA. The primary winding is electromagnetically coupled to a secondary winding 24, the secondary winding being connected to a controlled rectifier network 26. The output of the control rectifier network 26 is connected to a positive output conductor 28 and to a negative output conductor 30 as is conventional in systems of this type.

The rectifier network 26 includes a plurality of six controlled rectifiers 32, 34, 36, 38, 40, 42 which are connected in the conventional full wave rectifier network. The gate electrodes of the controlled rectifiers 32 to 42 are connected to a firing circuit 46 which controls the conduction of the controlled rectifiers 32 to 42 in response to three conditions. The first condition is the phase angle which is desired to fire the control rectifiers, this phase angle being controlled by means of a control amplifier circuit 48. The second condition is the on time and off time which is selected to control the control rectifiers 32 to 42, the on time and off time signal corresponding to the signal G. The on time and off time circuit 50 generates a plurality of pulses as is illustrated at the output of the off and on time system 50. The third condition which controls the firing of the controlled rectifiers 32 to 42 is a synchronizing signal generating network 52 which senses the zero-voltage crossover point for each phase. The synchronizing signal includes a transformer which is magnetically coupled to the primary windings of the transformer 22. In this way, the zero-voltage crossover point may be sensed by the synchronizing signal circuit 52.

Figure 3:
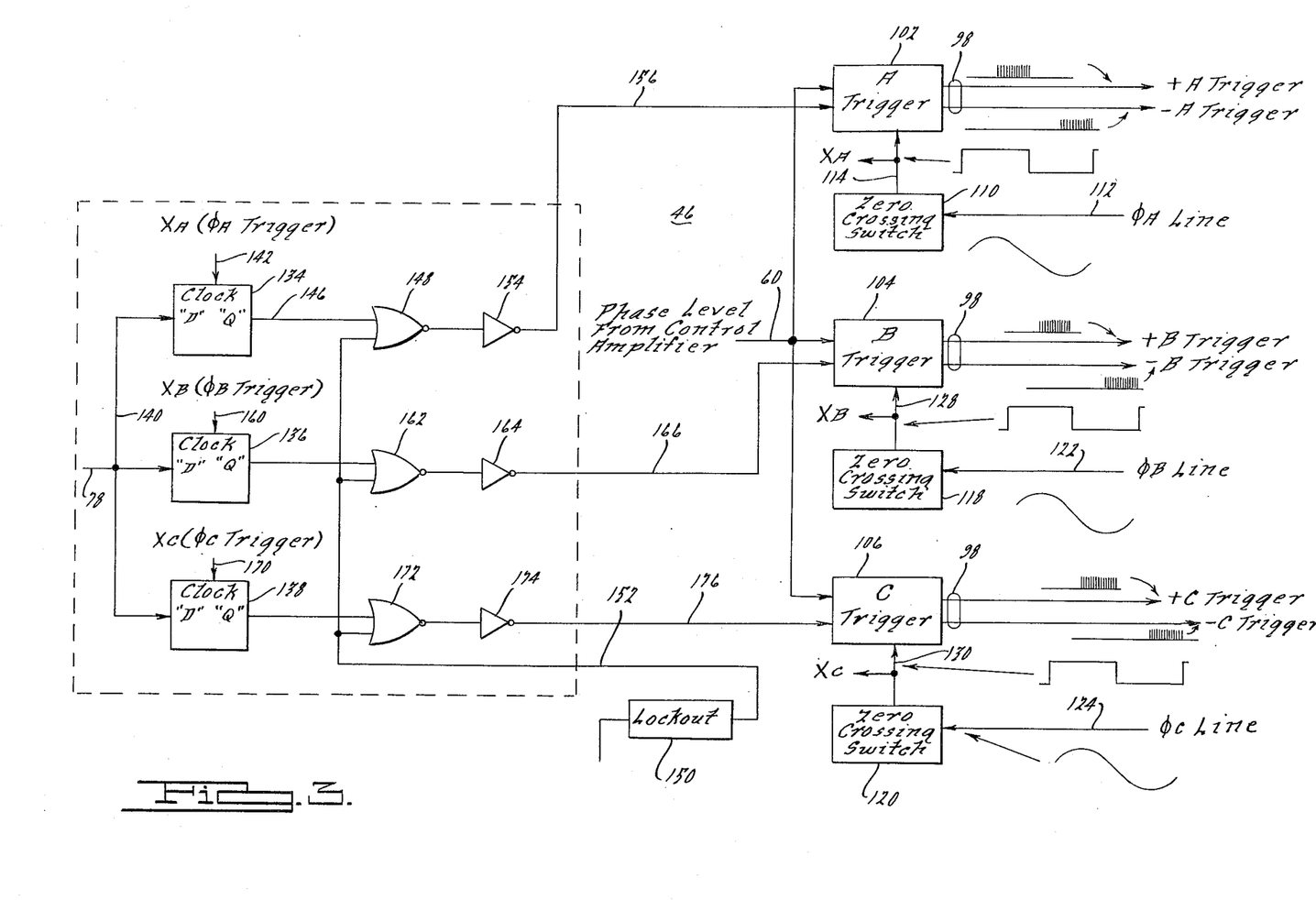
FIG. 3 is a schematic diagram illustrating the improved firing circuit for the system of the present invention.

Referring now to the specific details of FIG. 2, it is seen that the primary winding 22 supplies energy to the secondary winding 24 and thence to the rectifier output conductors 28, 30 through the controlled rectifier network 26. The controlled rectifier network 26 is controlled by means of the firing circuit 46, the details of which are illustrated in FIG. 3. The firing network 46 is provided with an input from the control amplifier circuit 48 which includes a control amplifier 58, the output which is fed to the firing circuit 46 by means of a conductor 60. The input to the control amplifier 58 is provided by a reference input connected to input conductor 60, the reference input being fed through a summing node 62. As will be seen from the description of FIG. 5, the control amplifier 58 includes an operational amplifier which provides an output current which is proportional to the reference input. The reference input, in this case, is the control unit which is manipulated by the operator to select a particular rectifier output.

This reference input is fed to the summing node 62 and the output of the control amplifier 58 is sensed by means of a feedback network which includes a feedback conductor 66. The summing node then algebraically sums the current flowing in the reference input 60 and the feedback conductor 66. The control amplifier 58 then provides sufficient output current on conductor 60 to balance the current flowing to the input thereof to provide a zero current flow at input conductor 70. This is the typical operation for an operational amplifier wherein the operational amplifier will provide whatever output current is necessary to provide zero input current at conductor 70. This operation will become more apparent from a description of FIG. 5.

Referring now to the off and on timing circuits, the off and on timing circuit includes an off time control circuit 72 and an on time control circuit 74. As was stated above, the off time control circuit 72 and the on time circuit 74 may take any form as for example a resistive-capacitive timing circuit, a pulse counting circuit, or even an operator timing the operation of the rectifier output with a stopwatch and an on-off switch. The output of the off time control circuit 72 and the on time control circuit 74 is fed to an off and on timing circuit 76 which provides output signals on an output conductor 78 as is illustrated above the conductor 78. As is seen from the timing diagram, the portion 80 corresponds to the off time and the portion 82 corresponds to the on time. This signal is fed to the firing circuit 46 by means of the conductor 78.

The third signal fed to the firing circuit 46 is provided by the synchronizing signal circuit 52 which includes a plurality of windings, corresponding to the primary windings 22. The phase AC is provided by winding 88, the CB phase corresponding to winding 90 and the BA phase corresponding to winding 92. These windings are the source of the "A" line, "B" line and "C" line signals to be described hereinafter in conjunction with the description of FIG. 3. The windings are shown in the conventional manner with a center tap provided by a conductor 94. The output of the synchronizing signal circuit 52 is fed to the input of the firing circuit 46 to provide an indication of the zero-voltage crossover point for the firing circuit 46. The output of the firing circuit 46 is fed to the gate electrodes of the control rectifier network 26 by means of a plurality of conductors 98 in the conventional manner.

Referring now to FIG. 3, there is illustrated the control circuit 46 described in conjunction with FIG. 2. As was stated above, the control circuit produces a plurality of output trigger pulses on conductors 98 to control the firing of the controlled rectifier network 26. As is seen from the details of circuit 46, the output pulses are illustrated in the form of a burst of firing pulses which start at the particular desired phase angle and end at the positive-to-negative transition of the alternating current line, in the case of the positive half wave, and end at the negative-to-positive transition, in the case of the negative half wave of the alternating current line.

Specifically, the trigger pulses on output conductors 98 are provided by an A trigger circuit 102, a B trigger circuit 104 and a C trigger circuit 106 corresponding to the firing circuits for the three phases supplying electrical energy to the load. The trigger circuits 102, 104, 106 are any conventional type of trigger circuit available on the market which produces a burst of output pulses at the proper phase angle and terminates those pulses at the end of each half wave. Of course, the trigger circuit could take any other form, as for example, a single firing pulse. In the case of the invention under discussion, the trigger circuit is responsive to three signals as described in conjunction with FIG. 2, one signal being the phase level from the control amplifier 58, another signal being the new gating signal G' fed thereto by means of a conductor 78, and the zero crossover point signal fed from the secondary windings 52 of the transformer.

Referring to the specific details of FIG. 3, and specifically the zero crossover sensing circuit, the waveform for phase A is fed to a zero crossing switch circuit 110 by means of a conductor 112. The waveform for phase A is illustrated below conductor 112 and is fed to the input of the zero crossing switch circuit 110. The zero crossing switch produces an output waveform illustrated above conductor 110 wherein the switch provides a transition from a logical zero level to a logical one level in response to the zero crossover point of the input waveform. The zero crossing switch may be any circuit suitable for this application, as for example, a Schmidt trigger. The output of the zero crossing switch is fed to the A trigger circuit 102 by means of a conductor 114 to provide the A trigger circuit with the pulse type waveform illustrated above conductor 112.

A similar situation exists for the B phase and C phase wherein the waveforms for the B and C phase are fed to zero crossing switch circuits 118, 120 by means of conductors 122, 124 corresponding to phases B and C. Again, the B and C phases are illustrated below conductors 122 and 124 respectively and are shown in phase relationship with phase A by the phase displacement of the waveforms from the phase A waveform illustrated below conductor 112. The output of zero crossing switch circuits 118, 120 are fed to the B trigger circuit 104 and the C trigger circuit 106 by means of conductors 128, 130 respectively. The waveforms being fed to the B trigger circuit 104 and the C trigger circuit 106 are illustrated above conductors 122, 124 respectively and are shown in phase relationship with pulsed waveform illustrated above conductor 112 corresponding to the A phase.

Referring now to the new gating signal G', it is seen that the gating signal G is fed to a plurality of D flip-flops 134, 136, 138 corresponding to phases A, B and C respectively. It is seen that a single gating signal G is generated for all three phases. Referring specifically to the phase A circuit, the gating signal G is fed to the D input of the D flip-flop 134 by means of a conductor 140. The gating signal G is presented to the D input and remains there at least until such time as the zero crossover point signal illustrated above conductor 112 is fed to the clock input of the flip-flop 134 by means of a conductor 142. Upon sensing the positive transition of the signal level on conductor 142, the data level of conductor 140 is stored in flip-flop 134 and fed to the "Q" output conductor 146. This signal level on conductor 146 corresponds to new gating signal G', which signal is fed to the input circuit of a nor gate 148.

The input circuit of the nor gate 148 is also provided with an input signal from a lockout circuit 150 which may be utilized to sense any condition within the system, for example, the loss of a phase, or a zero signal level within any phase due to switch bouncing or other conditions of this nature. Further, the lockout circuit 150 may sense abnormal conditions within the load as is common in this particular art. The output of lockout circuit 150 is fed to the input of gate 148 by means of a conductor 152, the output of gate 148 being inverted by means of an inverter circuit 154.

Accordingly, if the lockout circuit does not sense the abnormal condition described above, the output of flip-flop 134 will be fed to the trigger circuit 102 by means of a conductor 156. If the lockout circuit senses the abnormal condition, the gate 148 will be disabled to preclude the new gating signal G' from being fed through the gate 148.

A similar condition exists for the B phase wherein the gating signal G is fed to the D input of flip-flop 136 and is presented there until such time as the zero crossover point for the B phase is sensed by the zero crossing switch 118 and fed to the flip-flop 136 by means of a conductor 160. Upon sensing this condition, the new gating signal G' is generated at the Q output of flip-flop 136 and fed to nor gate 162. Again, the nor gate 162 is provided with the lockout signal from the lockout circuit 150 by means of the conductor 152. The output of gate 162 is fed through an inverter circuit 164 and then to the B trigger circuit 104 by means of a conductor 166. It will be noted that the new gating signal G' on conductor 166 will be out-of-phase from the new gating signal G' on conductor 156 by 120°, the amount of phase angle between phases A and B. This occurs due to the fact that the zero crossover signal on conductor 160 occurs 120° out-of-phase from the zero crossover signal on conductor 142.

The C phase is provided a new gating signal G' by means of the flip-flop 138 in response to the presentation of the gating signal G on conductor 140 to the D input and the zero crossover signal illustrated above conductor 124 being fed to an input conductor 170 connected to the clock input of flip-flop 138. When this coincidence occurs, the input signal level at the D input will be fed to the Q output and thence to a nor gate 172. The signal level is also stored in the flip-flop 138. As was the case above, the gate 172 is also provided with the lockout signal from the lockout circuit 150 by means of a conductor 152. Assuming there is no lockout condition, the output of gate 172 is fed through the C trigger circuit 106 by means of an inverter 174, the new gating signal G' being fed thereto by means of a conductor 176. Again, it will be noted that the start of the new gating signal G' on conductor 176 will lag the new gating signal on conductor 156 by two hundred forty degrees and will lag the new gating signal on conductor 166 by one hundred twenty degrees.

With the new gating signals G' being fed to the trigger circuits 102, 104, 106 corresponding to phases A, B and C, respectively, by means of conductors 156, 166 and 176, respectively, the trigger circuits 102, 104, 106 are enabled and ready to provide the burst of firing signals illustrated above and below conductors 98 in response to a phase level control signal from the control amplifier 58. This signal is fed to each of the trigger circuits 102, 104, 106 by means of the conductor 60 described in conjunction with FIG. 2. Thus, in response to the three conditions described in conjunction with FIG. 2, the trigger circuits 102, 104 and 106 will provide the necessary burst of firing pulses for each of the controlled rectifiers within the controlled rectifier network 26 corresponding to the particular phase to be controlled.

Referring to FIG. 4, there are illustrated further details for the circuit generating the new gating signal G' on conductors 156, 166 and 176 corresponding to phases A, B and C, respectively. As is seen from FIG. 4, the gating signal G is fed to the input conductor 78 and then to the D flip-flops 134, 136, 138 through a resistor 180. As was the case above, each new gating signal G' corresponding to phases A, B and C are fed to the inverter circuits 154, 164, 174 through gates 148, 162, 172 respectively. Again, the lockout signal is fed to the gates 148, 162, 172 by means of the conductor 152. It will be noted that a lockout signal generated in response to the loss of any phase or a zero signal level on any phase will lock out all of the firing signals for all three phases.

The inverter circuits 154, 164 and 174 are illustrated in the form of NPN transistors 182, 184, 186 corresponding to phases A, B and C respectively. The collector electrodes of each of the transistors are connected to a source of positive bias potential through resistors 188, 190, 192. The emitter electrodes are grounded. Accordingly, when the output signal from the gates 148, 162, 172 go from logical zero to a logical one level, the trigger on-off signals on output conductors 156, 166 and 176 drop from a logical one to a logical zero level. It is these signals that are fed to the trigger circuits described in conjunction with FIG. 3.

Figure 5:
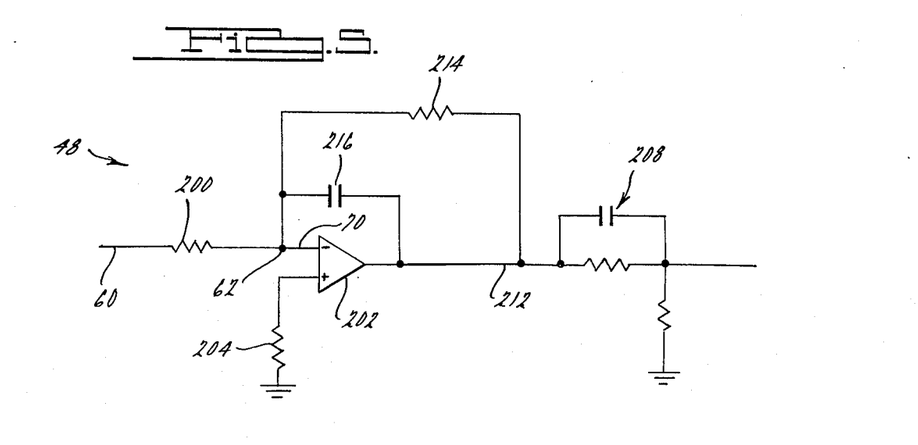
FIG. 5 is a schematic diagram illustrating the features of the control amplifier of FIG. 2.

Referring now to FIG. 5, there is illustrated the details of the controlled amplifier circuit 48 which is utilized to provide the proper phase angle signal for the firing circuits described in conjunction with FIG. 3. Specifically, the reference voltage is fed to the summing node 62 from the conductor 60 by means of a resistor 200. The summing node is connected to the upper input of an operational amplifier 202 through the summing node 62. The other input of the operational amplifier 202 is grounded through a resistor 204 as is typical. The output of the operational amplifier 202 is fed to a filter circuit 208 by a conductor 212, the filter network 208 providing lead compensation to compensate for any lag which is present in the trigger circuits. This is typical in systems of this type.

The operational amplifier 202 provides an output voltage which is proportional to the input signal presented at conductor 60. The input signal at conductor 60 is the operator controlled phasing signal to select the output of the rectifier system. This output signal is fed back to the input circuit of the operational amplifier 202 by means of a resistor 214 whereby the conductive operation of the operational amplifier is controlled by this feedback circuit to insure that a zero voltage is present on conductor 70.

In operation, a signal level is presented on conductor 60 which causes the operational amplifier 202 to provide an output signal on conductor 212. If this output signal is insufficient to provide a current flow through resistor 214 equal to that through resistor 200, a capacitor 216 will start to charge to balance the current into the node 62 providing a zero voltage on conductor 70. This will cause the operational amplifier 202 to provide a greater output signal at conductor 212 to compensate for the current flow to capacitor 216. This is a typical operation for operational amplifier 202.

It is contemplated that the inventive concepts and principles herein disclosed may be variously otherwise embodied and it is intended that the appended claims cover alternative embodiments except insofar as limited by the prior art.

I claim:

1. A firing control system for controlling the firing of at least one controlled rectifier or the like connected between a source of alternating current energy having positive and negative half waves and a load, the improvement comprising trigger circuit means for generating a firing signal for causing conduction of the controlled rectifier, sensing means connected to the source of electrical energy for generating a control signal in response to an electrical characteristic of the source of electrical energy, gate circuit means for generating at least an original gate signal, and correlating circuit means connected to said trigger circuit means and said sensing means and gate circuit means for generating a modified gate signal in response to the coincidence of said control signal and said original gate signal when said control signal occurs after said original gate signal occurs, said firing signal being precluded from occurring at least until said modified gate signal occurs, said modified gate signal being generated for a period wherein the positive half waves equals the negative half waves of the alternating current energy.

2. The improvement of claim 1 wherein the electrical characteristic is the zero crossover point of one of the voltage and current of the alternating current energy.

3. The improvement of claim 2 wherein said electrical characteristic is the negative-to-positive zero crossover point of the alternating current energy supply.

4. The improvement of claim 3 wherein said at least an original gate signal is generated asynchronously relative to the line voltage.

5. The improvement of claim 4 wherein said correlating circuit means includes bistable circuit means having at least two inputs and one output, said control signal being fed to one of said inputs and said at least an original gate signal being fed to the other of said inputs.

6. The improvement of claim 5 wherein said at least an original gate signal remains there until the occurrence of said control signal, said control signal causing said bistable circuit means to feed said control signal to said output and set the state of said bistable circuit means to correspond to the signal level of said control signal, said modified gate signal being said fed signal at said output.

7. The improvement of claim 6 further including lockout circuit means connected between said correlating circuit means and said trigger circuit means, said lockout circuit means sensing a condition within the control system and/or the source of alternating current energy for precluding the feeding of said modified gate signal to said trigger circuit.

8. The improvement of claim 1 wherein said system includes a multiphase source of alternating current energy and a plurality of controlled rectifiers connected between said source of energy and said load, said control system further including at least one trigger circuit means for each phase of said source of energy and a correlating circuit means for each phase of said source of energy, said control system generating a modified gate signal for each trigger circuit connected in each phase, said modified gate signals for each phase bearing the same phase relationship, one with the others, as the phases within the multiphase source of energy, bear one with the others.

9. The improvement of claim 8 further including a lockout circuit connected between said correlating circuit means and said trigger circuit means, and wherein said lockout circuit precludes the feeding of each modified gate signal in each phase in response to a single lockout signal.

10. A method of operating a firing control system for controlling the firing of at least one controlled rectifier or the like connected between a source of alternating current energy having positive and negative half waves and a load, the improvement comprising generating a firing signal for causing conduction of the controlled rectifier, generating a control signal in response to an electrical characteristic of the source of electrical energy, generating at least an original gate signal, and correlating said control signal and said at least original gate signal and generating a modified gate signal in response to the coincidence of said control signal and said original gate signal when said control signal occurs after said original gate signal occurs and precluding the generation of said firing signal at least until said modified gate signal occurs, said modified gate signal being generated for a period wherein the positive half waves of the alternating current energy.

11. The improvement of claim 10 wherein the electrical characteristic is the zero crossover point of one of the voltage and current of the alternating current energy.

12. The improvement of claim 11 wherein said electrical characteristic is the negative-to-positive zero crossover point of the alternating current energy supply.

13. The improvement of claim 12 wherein said at least an original gate signal is generated asynchronously relative to the line voltage.

14. The improvement of claim 13 wherein said correlating step includes feeding said control signal and said at least an original gate signal to a single correlating circuit.

15. The improvement of claim 14 wherein said control system includes an output terminal, said method wherein at least an original gate signal is presented to said correlating circuit to feed said control signal, said control signal causing said correlating circuit to feed said control signal to said output terminal and remain there until the signal level of said gate signal changes.

16. The improvement of claim 15 further including sensing a condition within the control system and/or the source of alternating current energy for precluding the generation of said firing signal.

17. The improvement of claim 10 wherein said system includes a multiphase source of alternating current energy and a plurality of controlled rectifiers connected between said source of energy and said load, said control system further including at least one trigger circuit means for each phase of said source of energy and a correlating circuit means for each phase of said source of energy, the method further comprising generating a modified gate signal for each trigger circuit connected in each phase, said modified gate signals for each phase bearing the same phase relationship, one with the others, as the phases within the multiphase source of energy, bear one with the others.

18. The improvement of claim 17 further including generating a lockout signal in response to an abnormal condition in said system, said lockout signal precluding the generation of each modified gate signal in each phase in response to a single lockout signal.

19. The improvement of claim 18 wherein said original gate signal is generated asynchronously with said source of alternating current energy.

* * * * *

UNITED STATES PATENT AND TRADEMARK OFFICE
CERTIFICATE OF CORRECTION

PATENT NO. : 3,978,394
DATED : August 31, 1976
INVENTOR(S) : Bruce R. Quayle

It is certified that error appears in the above-identified patent and that said Letters Patent are hereby corrected as shown below:

Column 6, line 42, after "time" insert --control--
Column 11, line 39, after "waves" insert --equal the negative half waves--

Signed and Sealed this

Twenty-eighth Day of December 1976

[SEAL]

Attest:

RUTH C. MASON
Attesting Officer

C. MARSHALL DANN
Commissioner of Patents and Trademarks